United States Patent
Guttman et al.

(10) Patent No.: US 10,416,601 B2
(45) Date of Patent: Sep. 17, 2019

(54) ADJUSTING IMAGING APPARATUSES

(71) Applicant: HP Indigo B.V., Amstelveen (NL)

(72) Inventors: Nir Guttman, Ness Ziona (IL);
Gregory Braverman, Ness Ziona (IL);
Ran Waidman, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/748,628

(22) PCT Filed: Jan. 14, 2016

(86) PCT No.: PCT/EP2016/050684
§ 371 (c)(1),
(2) Date: Jan. 29, 2018

(87) PCT Pub. No.: WO2017/121483
PCT Pub. Date: Jul. 20, 2017

(65) Prior Publication Data
US 2019/0004463 A1    Jan. 3, 2019

(51) Int. Cl.
*G03G 15/00* (2006.01)
*G03G 15/10* (2006.01)
*H04N 1/60* (2006.01)
*H04N 1/407* (2006.01)

(52) U.S. Cl.
CPC .......... *G03G 15/5058* (2013.01); *G03G 15/10* (2013.01); *G03G 15/5062* (2013.01); *H04N 1/4078* (2013.01); *H04N 1/60* (2013.01); *H04N 1/6033* (2013.01); *G03G 2215/00569* (2013.01)

(58) Field of Classification Search
CPC ........... G03G 15/5058; G03G 15/5062; G03G 2215/00033; G03G 2215/00037; G03G 2215/00042; H04N 1/60; H04N 1/4078; H04N 1/6033
See application file for complete search history.

(56) References Cited

U.S. PATENT DOCUMENTS

| | | |
|---|---|---|
| 5,864,353 A | 1/1999 | Gila et al. |
| 6,825,952 B1 | 11/2004 | Lee et al. |
| 7,054,565 B2 | 5/2006 | Shin |
| 7,423,778 B2 | 9/2008 | Hersch et al. |
| 7,800,779 B2 | 9/2010 | Fan et al. |
| 2010/0080587 A1 | 4/2010 | Booth et al. |
| 2013/0336666 A1* | 12/2013 | Amit .................. G03G 15/5062 399/15 |
| 2014/0368846 A1 | 12/2014 | Hadas et al. |
| 2015/0286907 A1 | 10/2015 | Hashizume |

FOREIGN PATENT DOCUMENTS

WO   WO-2012118479   9/2012

OTHER PUBLICATIONS

Thomas, K.J., The Development of the Toner Density Sensor for Closed-loop Feedback Laser Printer Calibration, 2009, 136 pages.

* cited by examiner

*Primary Examiner* — Hoang X Ngo
(74) *Attorney, Agent, or Firm* — Perry + Currier Inc

(57) ABSTRACT

A method of adjusting an imaging apparatus comprises printing a set of test patches, the set of test patches comprising a solid color patch, a grey level patch and a substrate patch. The optical densities of the set of test patches are determined. The method comprises simultaneously correcting a solid optical density value (Solid OD), relating to the solid color patch and an associated grey level (LUT) value relating to the grey level patch.

14 Claims, 7 Drawing Sheets

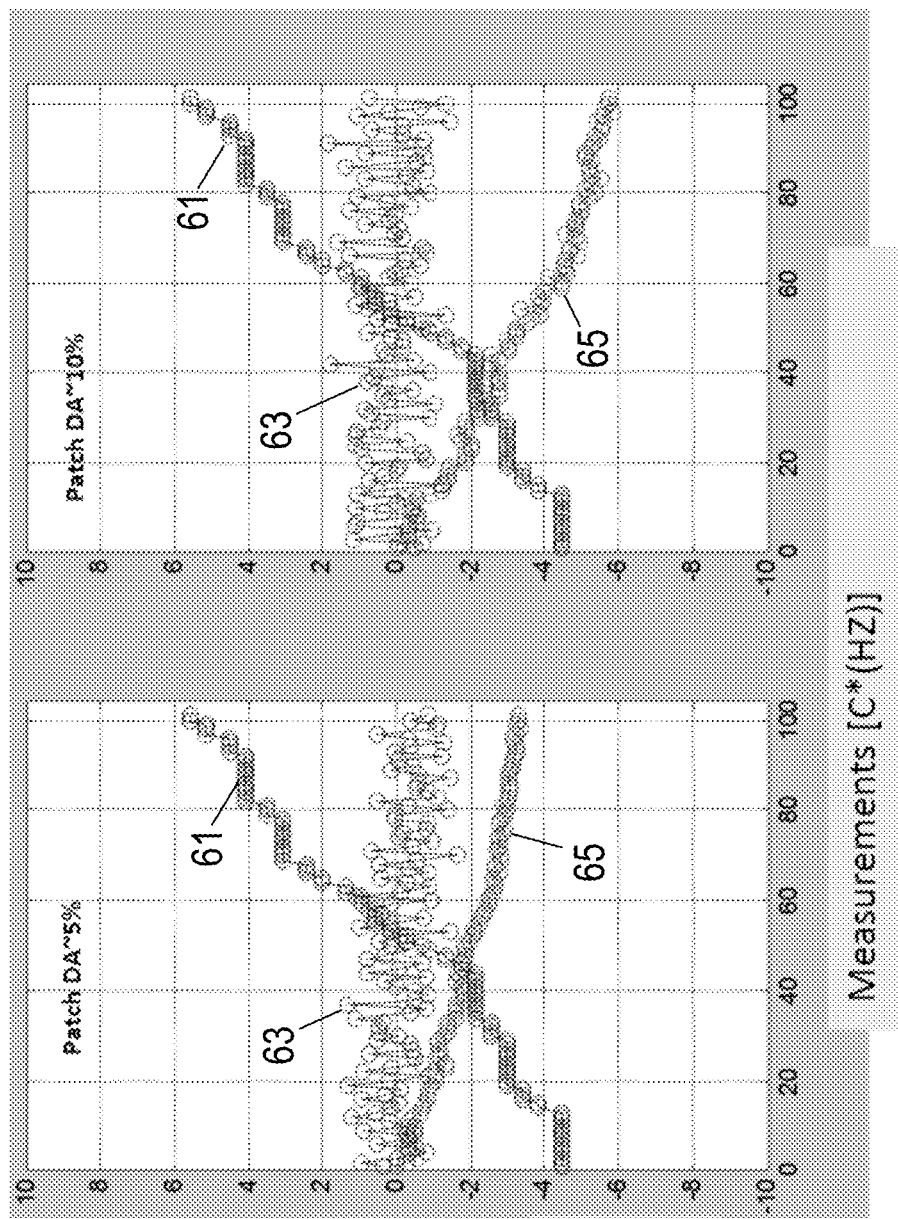

ADJUSTING IMAGING APPARATUSES

In an imaging apparatus, for example a liquid electrophotographic (LEP) printer, the optical density of solid printing is referred to as "solid OD", In an imaging apparatus the solid OD of a given color may be used to control the density of the given color in the final image. A look up table, LUT, may also be used to control the grey level distribution of the given color in the final image.

Instabilities in the solid OD and the associated LUT can be caused, for example, by instabilities in physical parameters of the imaging apparatus, such as temperature, charging and discharging voltages of a photoreceptor, and toner parameters such as toner conductivity.

BRIEF DESCRIPTION OF THE DRAWINGS

For a better understanding of the examples described herein, and to show more clearly how the examples may be carried into effect, reference will now be made, by way of example only, to the following drawings in which:

FIGS. 6a and 6b illustrate examples of continuous correction using simultaneous Solid OD and LUT correction.

DETAILED DESCRIPTION

Figure 1:
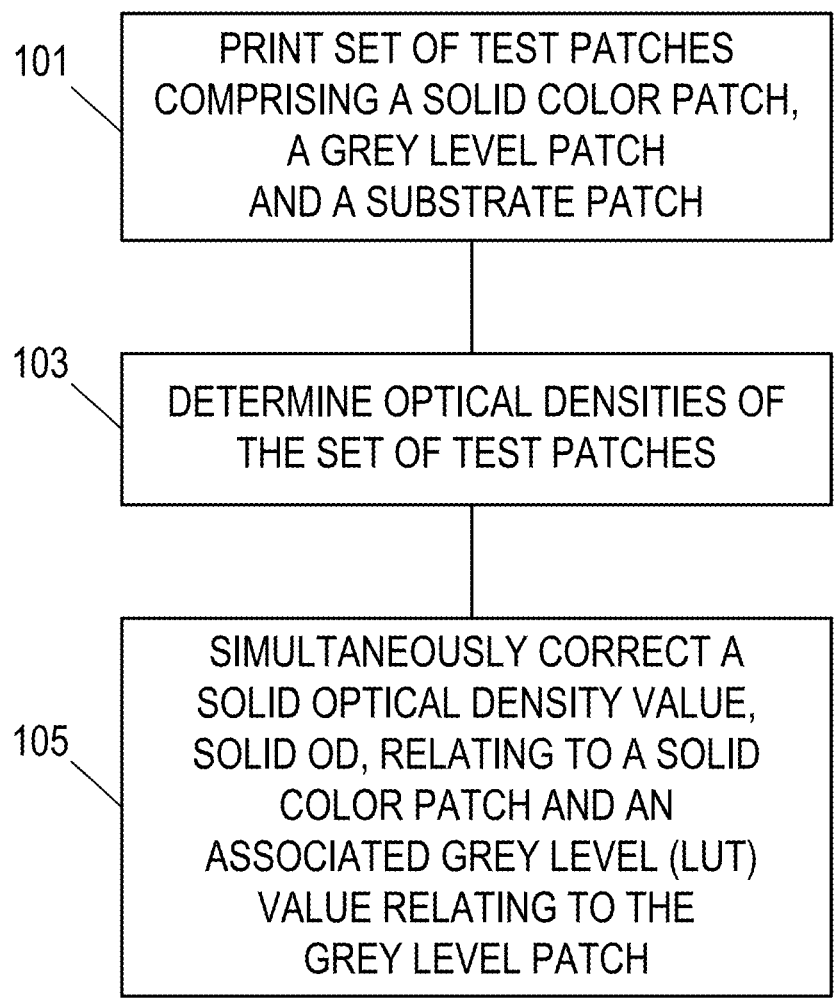
FIG. 1 shows a method according to an example.

Although examples mentioned below are described in relation to imaging apparatus comprising liquid electrophotographic (LEP) printers, it is noted that the examples can be applied to any form of imaging or printing apparatus.

LEP printers may comprise a photo imaging plate and a charge roller. A background voltage is applied to the photo imaging plate by passing the charge roller across its surface. A light source, such as a laser is shone on selected areas of the photo imaging plate to substantially discharge the selected areas and create a latent electrostatic image on a charged background of the photo imaging plate. When an electrostatic printing liquid, e.g. ink, is applied to the photo imaging plate, the potential differences between the charged background, the image areas and the electrostatic printing liquid are such that the electrostatic printing liquid is drawn for example to the image areas of the photo imaging plate. Thus an impression of the image areas can be printed by transferring the electrostatic printing liquid from the photo imaging plate to a print media, for example via an intermediate transfer member or blanket.

At least one control parameter may be used to control such an imaging apparatus. For example, control voltages may be used to control a photo imaging plate or a charge module.

The examples described herein provide a method for adjusting an imaging apparatus, and in some examples for performing a continuous single channel color calibration, i.e. continuous calibration on a channel color.

The color calibration methods in the examples described herein can be used to provide a continuous form of calibration, which enable the color state of an imaging apparatus, for example a press, to be kept as steady as possible by continuously controlling color calibration parameters and keeping them as close as possible to reference values (i.e. target values).

The term "Solid OD" relates to a print of 100% coverage value, and is the optical density value of such a 100% coverage.

The term "Machine LUT" relates to a Machine Look-up Table that determines the grey level printed value, given an input grey level value. The measured grey level or dot area (DA) may be determined using a measured optical density value using the following Equation:

$$DA = \frac{10^{-OD} - 10^{-ODpaper}}{10^{-ODsolid} - 10^{-ODpaper}}$$

where ODpaper relates to the determined optical density of the substrate (i.e. non-imaged patch), for example paper or plastic film, etc., and where ODsolid relates to the determined optical density 100% coverage value patch, i.e. of the solid patch (also referred to herein as Solid OD), and where OD relates to the determined optical density of the relevant grey level patch.

As mentioned in the background section, the color density of a final image may be related to two factors, namely the optical density of solid printing (i.e. the Solid OD), and the look-up-table (LUT) of the imaging apparatus. The LUT compensates, for example, for a dot gain of the imaging apparatus, i.e. the difference between the actual, printed, dot area and the dot area defined by the corresponding digital input. For example, the LUT may contain adjustment values for compensating for differences between the actual printed dot area and the dot area defined by the corresponding digital input.

FIG. 1 shows a method according to a first example of adjusting an imaging apparatus. The method comprises printing, 101, a set of test patches, the set of test patches comprising a solid color patch, a grey level patch and a substrate patch. The method comprises determining, 103, the optical densities of the set of test patches. The method comprises simultaneously correcting, 105, a solid optical density value (Solid OD), relating to the solid color patch and an associated grey level (e.g. look-up-table, LUT) value relating to the grey level patch. In some examples, the stage of determining the optical densities of the set of test patches comprises measuring a spectrum, e.g., a reflectance spectrum, of each patch, and calculating the optical density therefrom.

By simultaneous it is meant that the Solid OD and LUT are corrected in parallel, or together, after an initial set of test patches are printed and measured, and prior to a subsequent set of test patches being printed and analysed.

The correction of the LUT can be based on the solid OD measurement and correction. For example, if no correction is applied to the solid OD, the LUT correction is based on the LUT measurements alone;
if a correction is applied to the solid OD, the LUT correction is based on the LUT measurements and also on the solid measurement.

Therefore, the solid OD measurement can form an integral part of the LUT correction process, with both being corrected together at the same time.

In one example, correcting the solid optical density value, Solid OD, comprises comparing the determined solid optical density value, Solid OD, with a target optical density value, Target OD, for the solid color patch. A correction value to be applied to a control parameter of the imaging apparatus is determined as a function of a difference between the determined solid optical density value, Solid OD, and the target optical density value, Target OD.

Correcting the associated grey level (e.g. LUT) value may comprise determining a correction value to the grey level (LUT) value using predicted measurements. For example, this may comprise determining a correction value to the grey level (LUT) value by predicting what correction value is needed to the grey level (LUT) value based on a prediction of how the printed grey level (LUT) value will change given a change in the solid optical density value (Solid OD).

In one example, the method comprises first predicting a solid spectrum measurement with the determined correction to the solid optical density value applied, and second predicting a grey level (e.g. LUT) spectrum measurement based on the first predicted solid spectrum measurement.

Figure 2:
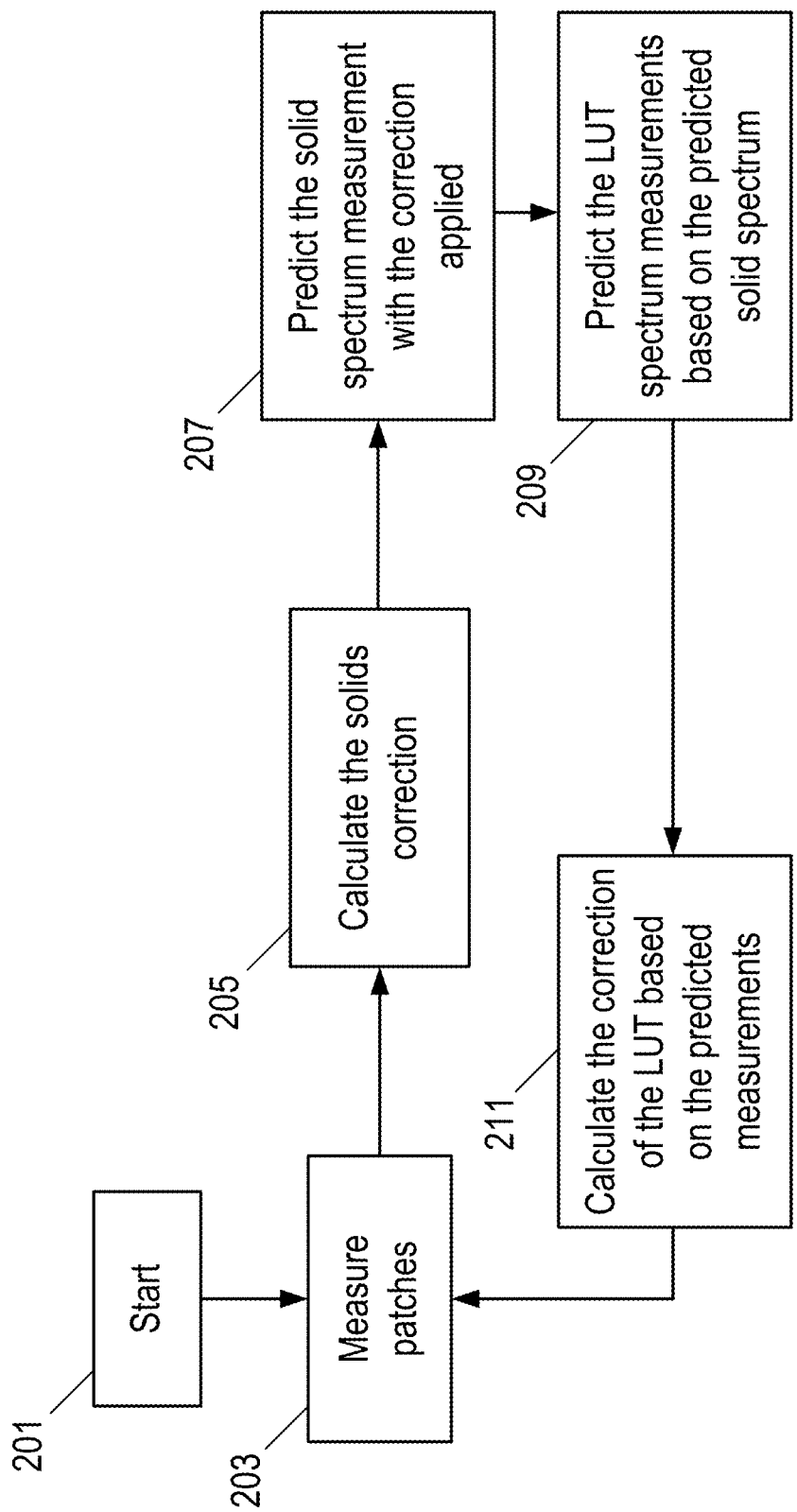
FIG. 2 shows a method according to another example.

FIG. 2 shows a method according to such an example. The method comprises measuring, 203, the optical densities of the set of patches. This may comprise, for example, measuring the spectrum of each patch and determining the optical density of each patch therefrom. The set of patches may comprise, for example, a solid color patch, a grey level patch and a substrate patch. Using these measurements, the correction of the solid is determined or calculated, 205.

The method further comprises first predicting, 207, the solid spectrum measurement with the correction applied to the solid. The method further comprises second predicting, 209, the grey level (e.g. LUT) spectrum measurements based on the first predicted solid spectrum (i.e. from stage 207). The correction of the grey level (e.g. LUT) is calculated, 211, based on the second predicted measurements of stage 209.

The stages of FIG. 2 may then be repeated, for example on a periodic basis, or on a continuous basis. In some examples the stages are repeated for each page that is printed. In other examples, for example when a rest time of a measurement device is a factor, the stages are repeated less frequently, for example on every other page, or even less frequently. In some examples, multiple test patches are printed of several grey level values, for example using LUT points of 10%, 20%, 30%, etc., although any LUT points may be used.

In one example the first and second predictions described in the method of FIG. 2 may rely on using first and second models, respectively.

In one example the first model predicts or estimates a solid spectrum $R_{solid}$ based on a control parameter value of the imaging apparatus. The second model relates the solid spectrum $R_{solid}$ with the grey level (e.g. LUT) spectrum.

With regard to the first model that predicts or estimates a solid spectrum $R_{solid}$ based on a control parameter value of the imaging apparatus, in one example such a model estimates the change in layer thickness. For example, Beer's law may be used as the first model, whereby:

$$R_{solid}=R_{sub}*e^{-L(\lambda)x}$$

where $L(\lambda)$ is a constant of the model per wavelength, x is the thickness, $R_{solid}$ is the spectrum of the solid color patch, and $R_{sub}$ is the spectrum of the substrate patch.

For example, the control parameter modifies the thickness x in order for the optical density (OD) to reach its target value. For each thickness x, the optical density (OD) can be calculated from the spectrum and the estimated $R_{solid}$ determined based on the change of the control parameter. According to some examples, the control parameter may comprise a voltage, for example a voltage of a developer of the imaging apparatus, which in turn controls the thickness x.

Thus, from the above it can be seen that a first model may be used to perform the first prediction, and wherein the first model estimates a solid spectrum $R_{solid}$ based on a control parameter value of the imaging apparatus.

With regard to the second model that relates the solid spectrum $R_{solid}$ with the grey level (halftoning level) spectrum, according to one example the second model has a functional form comprising:

$$S(R_{solid}, A, C)$$

where S is the predicted spectrum of the grey level, where $R_{solid}$ is the spectrum of the solid, where A is a parameter describing the area (or grey level), and where C is a set of additional parameters.

According to one example a Yule-Nielsen model can be used as the second model, whereby the Yule-Nielsen model comprises:

$$S(\lambda)=(A*R^n_{sub}(\lambda)+(1-A)*R^n_{solid}(\lambda))^{1/n}$$

where S is the predicted spectrum of the grey level, where $R_{sub}$ is the spectrum of the substrate and "n" the value of the power ($R_{sub}$ and "n" being examples of the set of additional parameters "C" mentioned above), where $R_{solid}$ is the spectrum of the solid, and where A is a parameter describing the area (or grey level). The second model can take into account the dependence of the dot gain as the solid control parameter changes.

Given the tools described in the examples above, according to another example a calibration procedure can be constructed, for example using the following stages.

In one stage, the next solid spectrum can be estimated according to the next control parameter value. Next, the area parameter (A) can be estimated using the current measurement. This may involve:

constructing a model (for example a Yule-Nielsen model) using the measured spectrum of the solid and substrate patches; and calculating a grey level patch L*a*b* color value. The L a b values are a set of coordinates that are used to describe color under certain conditions, such as specific illumination. The L*a*b* values can be calculated directly from the measured spectrum. The method may then comprise running though all possible area parameter (A) values of the model (e.g. Yule-Nielsen), and calculating the L*a*b* color value for each area parameter (A). Next, the method comprises determining the area parameter value that minimizes the dE value (defined below) with respect to the measured grey level L*a*b* color value.

$$\text{where } dE=\sqrt{(L_1-L_2)^2+(a_1-a_2)^2+(b_1-b_2)^2}$$

The determined area parameter is the optimized area value of the measured patch.

It is noted that the dE calculation is the Euclidian distance between two color coordinates, and can be used in optimizing the area parameter stage.

The method may then involve estimating the LUT patches measurements by using the model (e.g. Yule-Nielsen), the estimated solid spectrum (after the solid OD modification), and the optimized area parameter.

The LUT correction may then be calculated based on the estimated LUT patch measurements.

In this way, the Solid OD and the LUT are corrected simultaneously, based on a first set of patches, prior to any subsequent set of patches being printed and measured.

Figure 3:
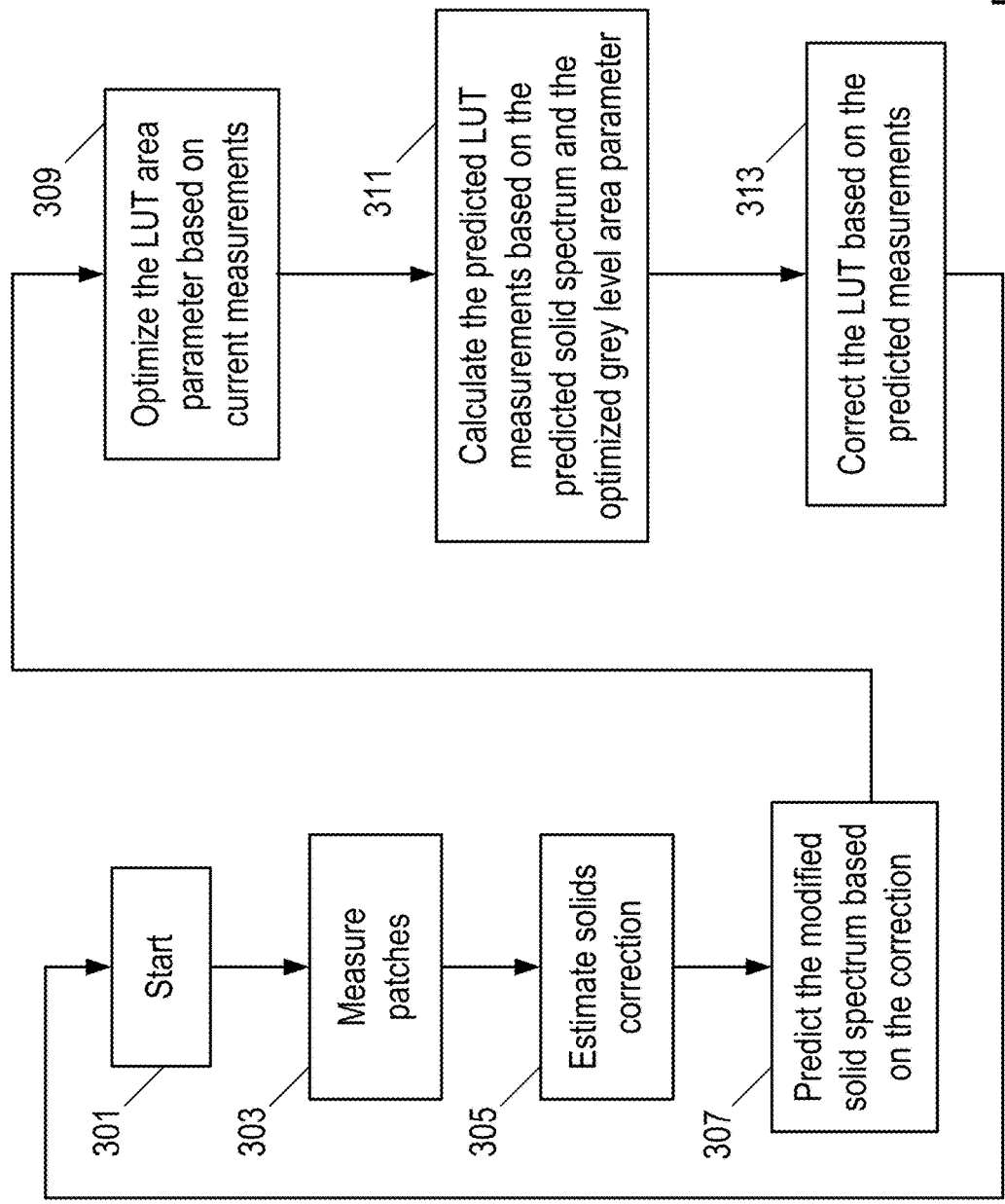
FIG. 3 shows a method according to another example.

Such an example is illustrated further in FIG. 3, which shows a simultaneous Solid OD and LUT correction according to an example. The method comprises measuring, 303, the optical densities of the set of patches. This may comprise, for example, measuring the spectrum of each patch and determining the optical density of each patch therefrom. The set of patches may comprise, for example, a solid color patch, a grey level patch and a substrate patch. Using these measurements, the solids correction is estimated, 305.

The method further comprises first predicting, 307, the modified solid spectrum based on the correction. The method further comprises optimizing the LUT area parameter based on current measurements, 309. This stage may involve, as mentioned earlier, constructing a model (for example a Yule-Nielsen model) using the measured spectrum of the solid and substrate patches, and whereby the determined area parameter is the optimized area value of the measured patch.

The method further comprises second predicting, 311, the grey level (e.g. LUT) spectrum measurements based on the first predicted solid spectrum (i.e. from stage 307) and the optimized grey level parameter (i.e., from stage 309). The correction of the grey level (e.g. LUT) is calculated, 313, based on the second predicted measurements of stage 311.

The stages of FIG. 3 may then be repeated, for example on a periodic basis, or on a continuous basis. In some examples the stages are repeated for each page. In other examples, for example when a rest time of a measurement device is a factor, the stages are repeated less frequently, for example on every other page, or even less frequently.

In the examples described herein, prior to determining a correction value to the solid optical density value, the method may comprise determining if a target value exists, and, if not, setting a previously measured value as the target value.

In some examples a solid color patch comprises a predetermined size, and consists of a patch with a 100% coverage value.

Figure 4:
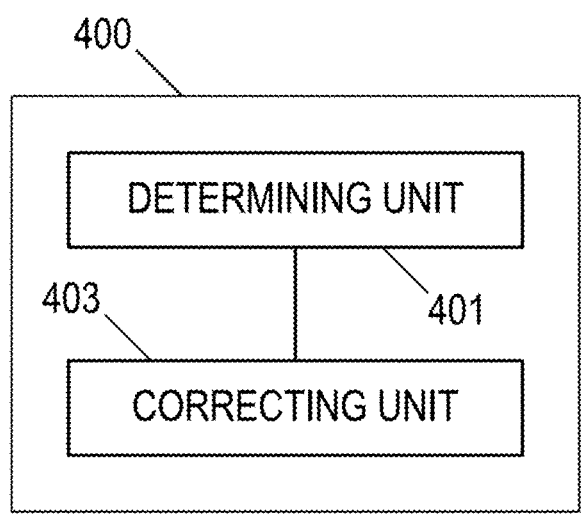
FIG. 4 shows an example of an imaging apparatus.

FIG. 4 shows an example of an imaging apparatus 400. The imaging apparatus 400 comprises a determining unit 401 to determine the optical densities of a printed set of test patches, the set of test patches comprising a solid color patch, a grey level patch and a substrate patch. In some examples determining the optical densities may comprise measuring the spectrum of the test patches, and calculating the optical densities therefrom. The imaging apparatus comprises a correcting unit 403 to simultaneously correct a solid optical density value (Solid OD) relating to the solid color patch and an associated grey level (e.g. LUT) value relating to the grey level patch.

In one example, the correcting unit 403 first predicts a solid spectrum measurement with the determined correction to the solid optical density value applied, and second predicts a grey level (e.g. LUT) spectrum measurement based on the first predicted solid spectrum measurement.

According to another example, there is provided a method of adjusting an imaging apparatus, whereby the method comprises: printing a first set of test patches, the first set of test patches including a solid color patch, a grey level patch and a substrate patch; determining the optical densities of the set of test patches; and correcting an optical density of the solid optical density value (Solid OD) relating to the solid color patch and an associated grey level (LUT) value prior to a second set of test patches being printed.

Figure 5:
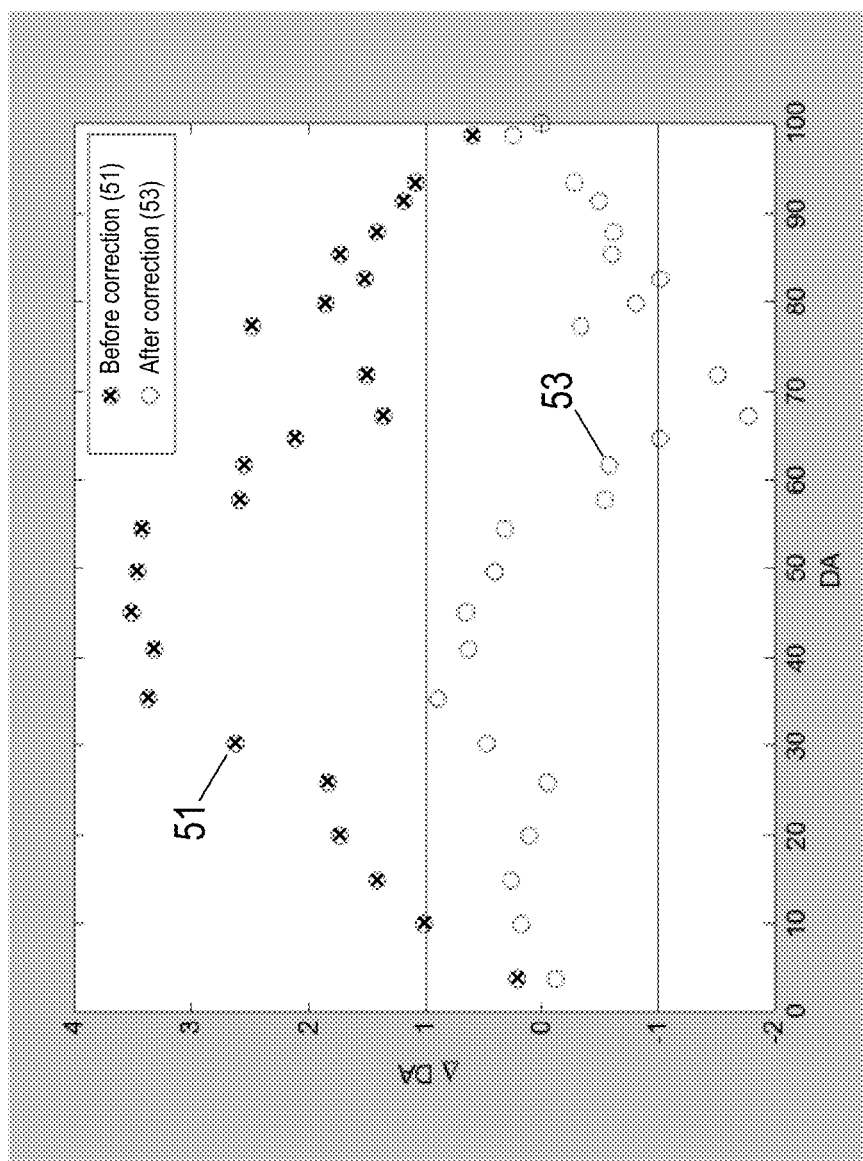
FIG. 5 illustrates an example of a dot gain prediction in a scenario where there is a decrease in the optical density of a solid color.

FIGS. 5 to 7 illustrate experimental results relating to the examples described herein.

FIG. 5 is an example of the dot gain prediction in a scenario where there is a decrease in the optical density of a solid color, i.e. a decrease in Solid OD. In this example it is assumed that a Yule-Nielsen model has been used to predict the spectrum of the LUT as a result of a change in the solid spectrum, Solid OD.

ΔDA, before correction (illustrated by the references on the upper curve 51 in FIG. 5), is defined as the difference between the dot area DA before the change in Solid OD to the measured dot area DA after the change in the Solid OD.

ΔDA, after correction (illustrated by the references on the lower curve 53 in FIG. 5), is defined as the difference between the estimated dot area DA (e.g. using the Yule-Nielsen model, due to the change in Solid OD) to the measured dot area DA after the change in the Solid OD.

The plot shown in FIG. 5 shows that the estimated dot area DA is in good agreement with the measurements.

FIGS. 6a and 6b illustrate examples of continuous correction using simultaneous Solid OD and LUT correction, according to examples described herein. FIG. 6a relates to a patch dot area DA of about 5%, while FIG. 6b relates to a patch dot area DA of about 10%.

In each of FIGS. 6a and 6b the x-axis is a measurement number, and is related to an example of the measurement rate. So in principle, if measurements are made every minute, each tick corresponds to a minute.

Each curve has different units in the y-axis: the plot labelled 61 relates to the solid thickness correction factor (e.g. a voltage change—normalized to a similar scale of the other graphs), while the plot labelled 63 relates to the difference from the target values (e.g. the DA difference between the measured values and target values), while the plot labelled 65 relates to the difference of LUT correction (e.g. the amount of correction in DA added or subtracted from the original LUT).

In contrast to the examples described herein, it has been proposed that, to provide correction of an imaging apparatus, an imaging apparatus instead prints and measures patches followed by correction of the solids, followed by printing and measuring patches followed by correcting the LUT. A disadvantage of such a proposal is that each of the solid OD and LUT is corrected independently and not at the same time.

Figures 7A, 7B:
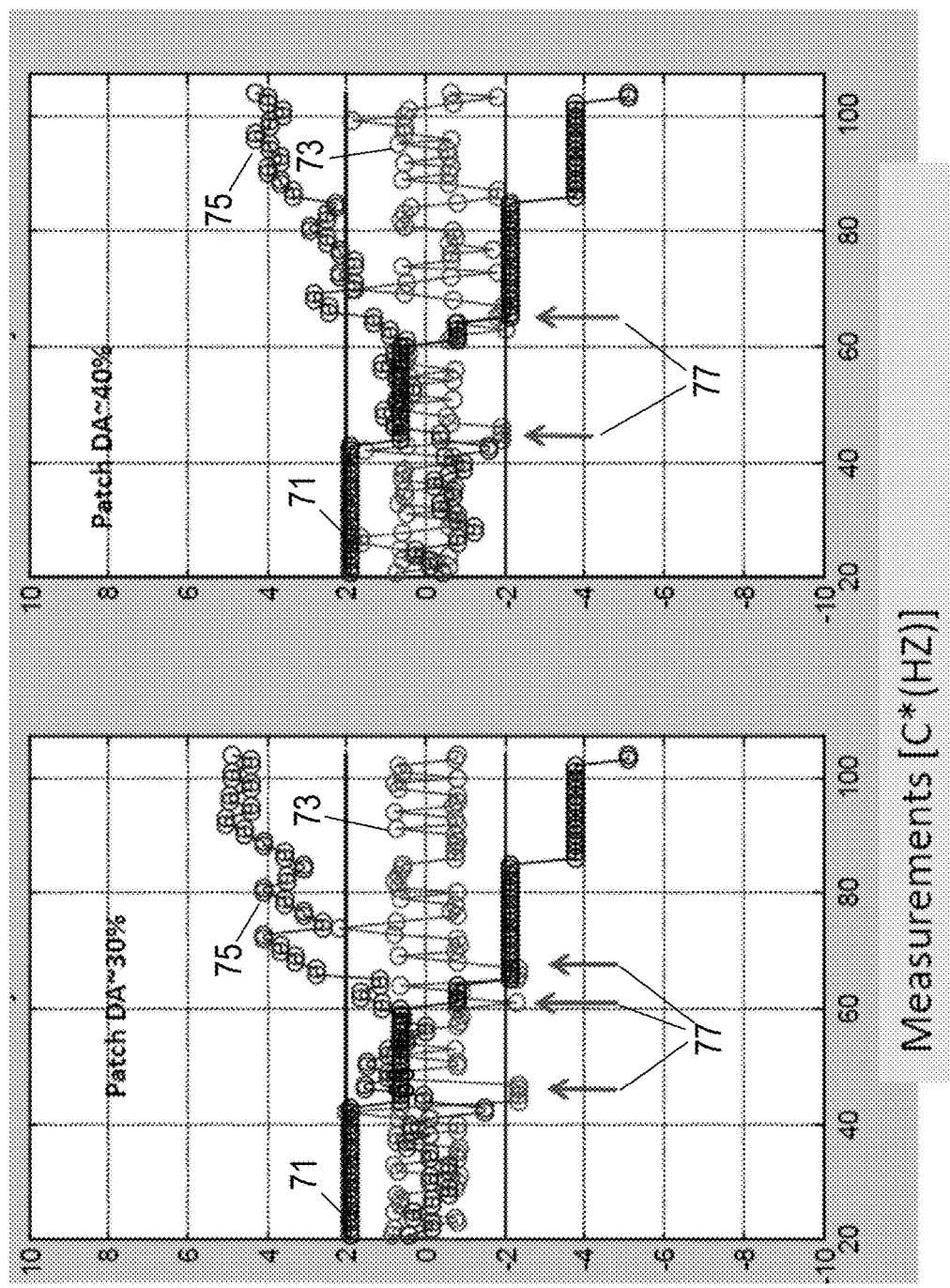
FIGS. 7a and 7b illustrate examples of continuous correction using independent Solid OD and LUT correction.

FIGS. 7a and 7b illustrate examples of continuous correction using such independent Solid OD and LUT correction, such that a comparison can be made to the simultaneous Solid OD and LUT correction illustrated in the results of FIGS. 6a and 6b. FIG. 7a relates to a patch dot area DA of about 30%, while FIG. 7b relates to a patch dot area DA of about 40%.

In each of FIGS. 7a and 7b the plot labelled 71 relates to the solid thickness correction factor, while the plot labelled 73 relates to the difference from the target values, while the plot labelled 75 relates to the difference of LUT correction. The arrows labelled 77 indicate a measurement in which the dot area DA was modified due to a change in Solid OD value.

From these figures it can be seen that, when the correction is not done simultaneously (corresponding to the results in FIGS. 6a and 6b), a significant deviation from the target value might occur due to modification of the solid OD control parameter (marked by the arrows). This significant deviation can be avoided by the simultaneous correction method of the described examples. In addition, the larger frequency of the simultaneous correction can be noted. Furthermore, the smoothness of the simultaneous correction can be seen compared to the less smooth correction when each quantity is corrected separately.

From the above it can be seen that, in some examples described herein, a method may include receiving from a printer device an output image consisting of patches. Measured reflection values are received corresponding to the patches. An analysis is performed on the measured values, and a correction is provided, to the Solid OD and LUT simultaneously, to maintain the printer in its target state. The method performed by the examples may involve advanced data analysis, thus yielding high calibration performances in several aspects.

Since both correction types are performed together, or simultaneously, according to the examples described herein, an imaging apparatus is able to return to its target values more quickly.

Furthermore, since both correction types are performed together, the frequency of the correction can be approximately doubled, since each stage can perform both the correction types (i.e. solid OD and LUT together).

Some examples perform the correction in a continuous or periodic manner. Such examples provide a smoother correction operation since, generally, the corrections are estimated to be smaller at each stage, since they are performed more frequently. In addition, with such examples the drift from the target values can be lower, due to the smaller correction timeframes.

The examples described above enable an automatic continuous color calibration to be provided. The examples can help maintaining an imaging apparatus at a color target state, for example for the duration of its operation. The examples can also be used to help prevent an imaging apparatus from experiencing a drift of color over time.

It is noted that the measurements mentioned above may comprise, for example, measuring the reflectance, or the measurement of a spectrum measured by a spectrophotometer.

In some examples described above printing a solid color patch may comprise printing a patch having a 100% coverage value, and adjusting the imaging apparatus may comprise adjusting a parameter of the imaging apparatus that controls an ink layer thickness (for example by controlling the voltage of an ink developer in a LEP type imaging apparatus).

In some examples described above, printing a grey level patch, e.g. for a Machine LUT, may comprise printing multiple patches of several grey level values (for example grey level values of 5%, 20%, 50%, etc.,) and correcting the LUT values based on the dot area (DA) calculated from these measurements.

The examples described above also enable a more flexible adjusting mechanism to be provided, for example a more flexible correction mechanism, whereby a core model using in the adjustment process can be easily replaced with another, e.g. if a more suitable model is found (e.g. offset versus digital printing).

Although the examples have been described in relation to LEP printers, it is noted that the methods described herein may also be applied to other types of printers, including for example 3D printers where color measurements may be taken from a printed 3D object in place of an image printed on a substrate.

It should be noted that the above-mentioned examples illustrate rather than limit the disclosure, and that those skilled in the art will be able to design many alternative examples without departing from the scope of the appended claims. The word "comprising" does not exclude the presence of elements or stages other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of adjusting an imaging apparatus, the method comprising:
   printing a set of test patches, the set of test patches comprising a solid color patch, a grey level patch and a substrate patch;
   determining the optical densities of the set of test patches; and
   simultaneously correcting a solid optical density value (Solid OD) relating to the solid color patch and an associated grey level (LUT) value relating to the grey level patch, wherein correcting the associated grey level (LUT) value includes determining a correction value to the associated grey level (LUT) value using a predicted solid optical density value (Solid OD) measurement.

2. A method as claimed in claim 1, wherein correcting the solid optical density value (Solid OD) comprises:
   comparing the determined solid optical density value (Solid OD) with a target optical density value (Target OD) for the solid color patch; and
   determining a correction value needed to a control parameter of the imaging apparatus as a function of difference between the measured solid optical density value (Solid OD) and the target optical density value (Target OD).

3. A method as claimed in claim 1 comprising:
   determining the correction value to the grey level (LUT) value by predicting what correction value is needed to the grey level (LUT) value based on a prediction of how the printed grey level (LUT) value will change given a change in the solid optical density value (Solid OD).

4. A method as claimed in claim 3 comprising:
   first predicting a solid spectrum measurement with the determined correction to the solid optical density value applied; and
   second predicting a grey level (LUT) spectrum measurement based on the first predicted solid spectrum measurement.

5. A method as claimed in claim 4, wherein a first model is used to perform the first prediction, and wherein the first model estimates a solid spectrum ($R_{solid}$) based on a control parameter value of the imaging apparatus.

6. A method as claimed in claim 5, wherein predicting the solid spectrum, $R_{solid}$, using the first model comprises:

$$R_{solid} = R_{sub} * e^{-L(\lambda)x},$$

where $L(\lambda)$ is a constant of the model per wavelength, x is the thickness, $R_{solid}$ is the spectrum of the solid color patch, and $R_{sub}$ is the spectrum of the substrate patch.

7. A method as claimed in claim 4, wherein a second model is used to perform the second prediction, and wherein the second model relates the solid spectrum, $R_{solid}$, with the grey level (LUT) spectrum.

8. A method as claimed in claim 7, wherein relating the solid spectrum, $R_{solid}$, with the grey level (LUT) spectrum using the second model comprises:

$$S(\lambda) = (A * R^n_{sub}(\lambda) + (1-A) * R^n_{solid}(\lambda))^{1/n},$$

where S is the predicted spectrum of the grey level, where $R_{sub}$ is the spectrum of the substrate and "n" the value of the power, where $R_{solid}$ is the spectrum of the solid, and where A is a parameter describing the grey level.

9. A method as claimed in claim 3, wherein the parameter A describing the grey level is optimized using the equation:

$$dE=\sqrt{(L_1-L_2)^2+a_1-a_2)^2+(b_1-b_2)^2},$$

where the L*a*b* values relate to a set of coordinates used to describe color under certain conditions, and whereby the dE calculation relates to an Euclidian distance between two color coordinates.

10. A method as claimed in claim 1, wherein printing a set of test patches and simultaneously correcting a solid optical density value (Solid OD) relating to the solid color patch and an associated grey level (LUT) value relating to the grey level patch is performed on a continuous or periodic basis.

11. A method as claimed in claim 1 comprising:
prior to determining a correction value to the solid optical density value, determining if a target value exists, and if not, setting a previously measured value as the target value.

12. An imaging apparatus comprising:
a determining unit to measure the optical densities of a printed set of test patches, the set of test patches comprising a solid color patch, a grey level patch and a substrate patch; and
a correcting unit to simultaneously correct a solid optical density value (Solid OD) relating to the solid color patch and an associated grey level (LUT) value relating to the grey level patch, wherein the correcting unit is to determine a correction value to the associated grey level (LUT) value using a predicted solid optical density value (Solid OD) measurement.

13. An imaging apparatus as claimed in claim 12, wherein the correcting unit:
first predicts a solid spectrum measurement with the determined correction to the solid optical density value applied; and
second predicts a grey level (LUT) spectrum measurement based on the first predicted solid spectrum measurement.

14. A method of adjusting an imaging apparatus, the method comprising:
printing a first set of test patches, the first set of test patches including a solid color patch, a grey level patch and a substrate patch;
determining the optical densities of the set of test patches; and
correcting an optical density of the solid optical density value (Solid OD) relating to the solid color patch and an associated grey level (LUT) value prior to a second set of test patches being printed, wherein correcting the associated grey level (LUT) value includes determining a correction value to the associated grey level (LUT) value using a predicted solid optical density value (Solid OD) measurement.

* * * * *